United States Patent
Cole et al.

(10) Patent No.: US 10,414,476 B2
(45) Date of Patent: Sep. 17, 2019

(54) SURFACE-LEVEL BUOY ASSEMBLY FOR ETHERNET CONNECTIVITY OF A SUB-SURFACE MOBILE DEVICE

(71) Applicant: The United States of America, as represented by the Secretary of the Navy, Crane, IN (US)

(72) Inventors: Aaron B. Cole, Bloomington, IN (US); Donald R. Thompson, Zionsville, IN (US); Manda Schaeffer, Bloomington, IN (US); Steven M. Seghi, Bloomington, IN (US); Travis W. Vincent, Owensburg, IN (US); Zachary P. Steffes, Bloomington, IN (US)

(73) Assignee: The United States of America, as represented by the Secretary of the Navy, Washington, DC (US)

( * ) Notice: Subject to any disclaimer, the term of this patent is extended or adjusted under 35 U.S.C. 154(b) by 0 days.

(21) Appl. No.: 15/829,851

(22) Filed: Dec. 1, 2017

(65) Prior Publication Data
US 2018/0154993 A1 Jun. 7, 2018

Related U.S. Application Data

(60) Provisional application No. 62/428,826, filed on Dec. 1, 2016.

(51) Int. Cl.
| | |
|---|---|
| *H04B 1/40* | (2015.01) |
| *B63C 11/26* | (2006.01) |
| *B63B 22/00* | (2006.01) |
| *H04M 1/15* | (2006.01) |
| *H04M 1/18* | (2006.01) |

(52) U.S. Cl.
CPC ............ *B63C 11/26* (2013.01); *B63B 22/00* (2013.01); *H04M 1/15* (2013.01); *H04M 1/18* (2013.01); *B63B 2203/00* (2013.01); *B63B 2211/04* (2013.01)

(58) Field of Classification Search
None
See application file for complete search history.

(56) References Cited

U.S. PATENT DOCUMENTS

| | | | | |
|---|---|---|---|---|
| 5,592,156 | A * | 1/1997 | James | H04B 13/02 340/850 |
| 5,956,291 | A * | 9/1999 | Nehemiah et al. | H04B 11/00 367/131 |
| 6,807,127 | B2 * | 10/2004 | McGeever, Jr. | B63C 11/26 367/128 |
| 7,289,907 | B2 * | 10/2007 | Meinig | G01V 1/008 702/2 |
| 8,009,516 | B2 * | 8/2011 | Crowell | H04B 11/00 367/128 |
| 8,102,733 | B2 * | 1/2012 | Rapp | H04B 11/00 367/134 |
| 8,625,393 | B2 * | 1/2014 | Sonnenschein | H04B 11/00 367/131 |
| 9,563,203 | B2 * | 2/2017 | Davoodi | G05D 1/0088 |

(Continued)

*Primary Examiner* — Tuan A Tran
(74) *Attorney, Agent, or Firm* — Christopher A. Monsey

(57) ABSTRACT

Exemplary systems enable operation of mobile devices underwater. Antennas on a buoy assembly allow a mobile device to maintain wireless communications. A series of cable segments connect a buoy assembly to a waterproof case capable of sealing a mobile device.

14 Claims, 20 Drawing Sheets

(56) References Cited

U.S. PATENT DOCUMENTS

| | | | |
|---|---|---|---|
| 9,616,982 B2* | 4/2017 | Hollis | B63C 11/26 |
| 9,645,223 B2* | 5/2017 | Megdal | G01S 5/0045 |
| 2002/0140599 A1* | 10/2002 | King | B63C 11/26 342/357.57 |

* cited by examiner

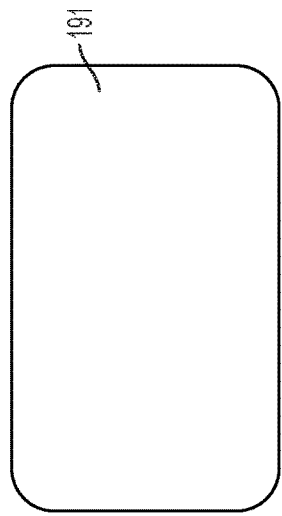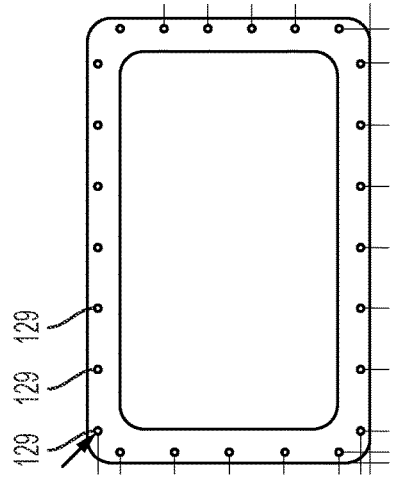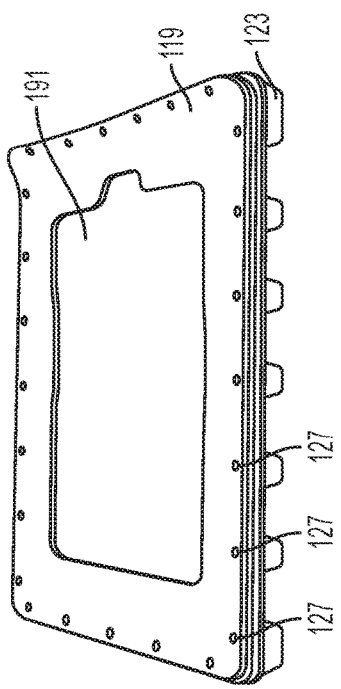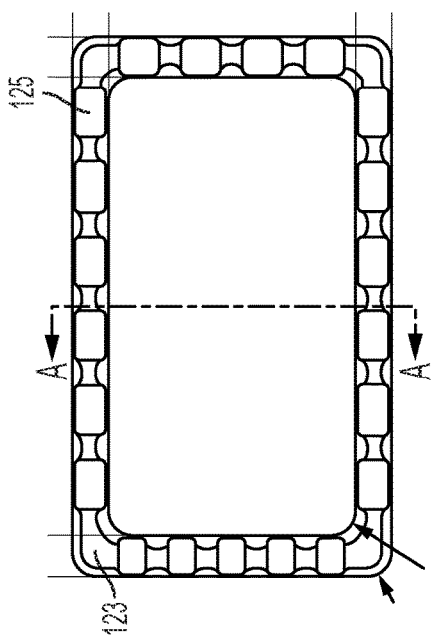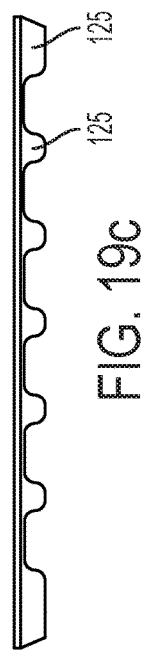

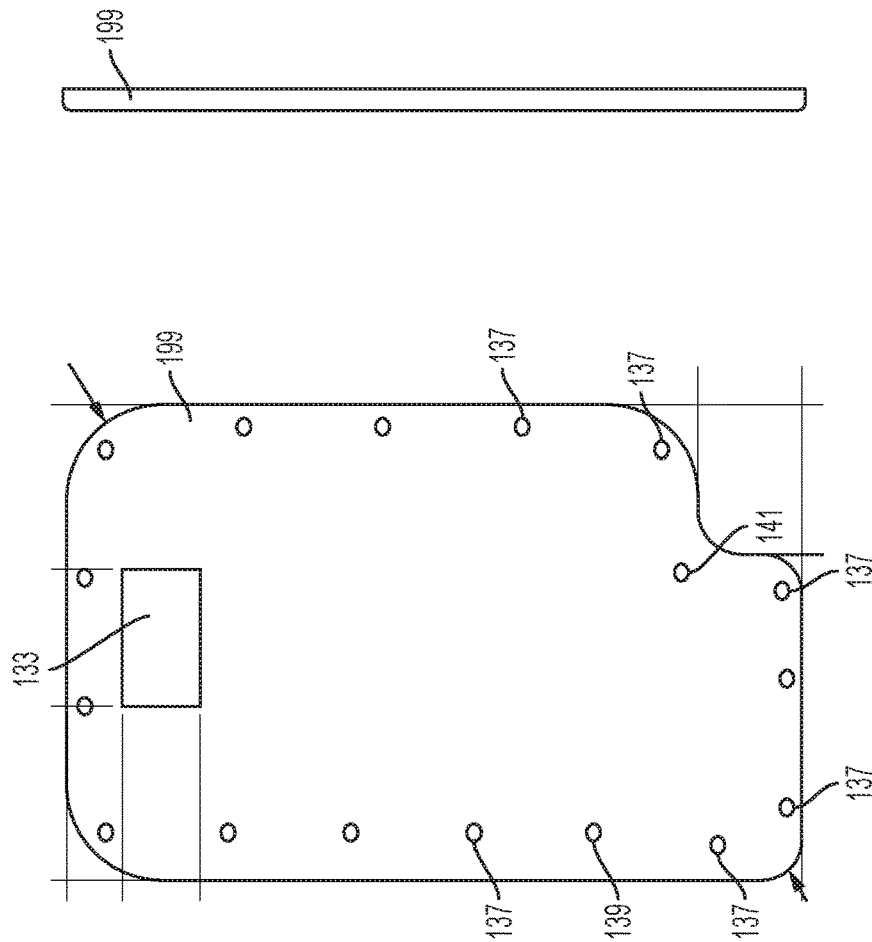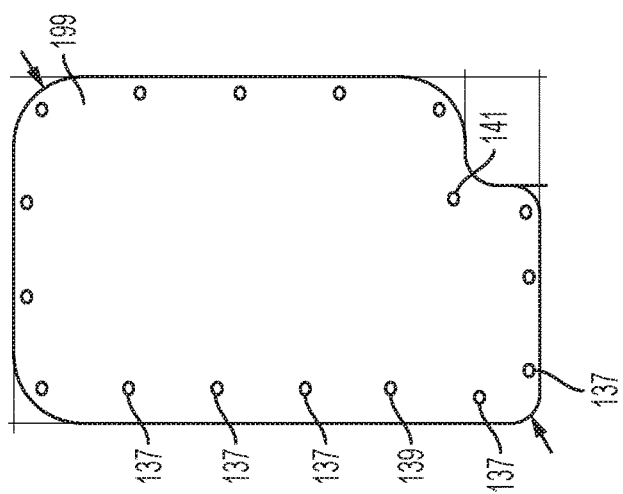

SURFACE-LEVEL BUOY ASSEMBLY FOR ETHERNET CONNECTIVITY OF A SUB-SURFACE MOBILE DEVICE

CROSS-REFERENCE TO RELATED APPLICATIONS

The present application claims priority to U.S. Provisional Patent Application Ser. No. 62/428,826, filed Dec. 1, 2016, entitled "MOBILE DEVICE SYSTEM CONFIGURED TO OPERATE UNDERWATER INCLUDING A SURFACE-LEVEL BUOY ASSEMBLY AND A NETWORK COMMUNICATION DEVICE ENABLING NETWORK CONNECTIVITY BETWEEN THE SUBMERGED MOBILE DEVICE SYSTEM AND OTHER SYSTEMS ALONG WITH RELATED METHODS," the disclosure of which is expressly incorporated by reference herein.

STATEMENT REGARDING FEDERALLY SPONSORED RESEARCH OR DEVELOPMENT

The invention described herein was made in the performance of official duties by employees of the Department of the Navy and may be manufactured, used and licensed by or for the United States Government for any governmental purpose without payment of any royalties thereon. This invention (Navy Case 200,392) is assigned to the United States Government and is available for licensing for commercial purposes. Licensing and technical inquiries may be directed to the Technology Transfer Office, Naval Surface Warfare Center Crane, email: Cran_CTO@navy.mil.

BACKGROUND AND SUMMARY OF THE INVENTION

Presently there is no system that allows persons working underwater to have mobile device communication, or to transfer data from a phone located underwater to radio or antenna on the surface of the water. In particular, the use of mobile devices underwater is particularly stunted due to the lack of ethernet connectivity underwater and the lack of data port plug-ins. For example, divers presently do not have the ability to connect to the surface of the water nor do they have full capability of a mobile device underwater. Methods used by divers and others working underwater include waterproofing cables by using heat shrink which is not an effective means to prevent water intrusion long term. Additionally heat shrink makes the cables unable to bend and flex, which is necessary in a dynamic environment such as the ocean. Cables used to try to enable devices to work underwater are used to dive once, but then the cable must be dried sometimes for days before being used again.

The present invention solves this problem by enabling divers and other underwater recreation or professions to use exemplary mobile devices while they are underwater. The present invention relates to underwater functionality of an exemplary mobile device via an exemplary buoy assembly connected via commercially available cables to waterproof data port plug-ins. The objective of the present invention is to establish connectivity to the exemplary underwater mobile device via a system of cable connections, where the cable connection antennae are kept above water no less than 95% of the time via the exemplary buoy system. The antennae could include GPS and other communication cables, but could further include any other antennae suitable to the purpose of the divers. The system of the present invention could also be used by anyone with the need for an underwater connection to surface signals via mobile device such as smart phones, tablets, ethernet-connected GPS devices, and other mobile devices that can be enabled by an ethernet connection. The design of the present invention preferably accommodates either smart phones or tablets.

The underwater mobile device is contained in a waterproof case that, in contrast to traditional touchscreen interfaces that do not work underwater, allows the full functionality of the touch screen mobile device to be utilized at any depth of immersion in water. The waterproof case additionally has an exemplary stylus pen that enables the full functionality of the exemplary mobile device at any depth of immersion in water. The underwater mobile device transfers data via an ethernet connection cable to an exemplary radio contained in the buoy, and antenna above the surface of the water.

The exemplary buoy assembly allows ethernet connectivity (for example, enabling GPS and communications) for use of navigation and communication technologies on the exemplary mobile device. The system of the present invention is further commercially applicable for any application requiring an underwater connection to surface signals, e.g., as required in tracking, underwater demolition, and commercial diving. For purposes of the present invention, the design of the exemplary buoy additionally makes little to no noise or splash, is hard to see, provides insignificant drag to the diver, and is retrofitted to provide continual connectivity with the communications systems plugged into the exemplary mobile device.

The exemplary waterproof case contains an underwater touchscreen interface case that has a source for an ethernet cable connection, a screen that can be touched through, a cable connector to connect to a surface antenna, and touch screen capabilities to a 10-inch touch depth, with a stylus pen as described above for full touch screen capabilities at greater depth.

According to a further illustrative embodiment of the present disclosure, the exemplary underwater touchscreen interface case is filled with air. The exemplary underwater touchscreen interface case of the present invention seals and protects any mobile device and permits native operation such as touch button pushing and the full capability of the device enclosed within it.

According to yet another illustrative embodiment of the present disclosure, the exemplary underwater touchscreen interface case need not be opened unless the phone itself malfunctions or breaks.

Additional features and advantages of the present invention will become apparent to those skilled in the art upon consideration of the following detailed description of the illustrative embodiment exemplifying the best mode of carrying out the invention as presently perceived.

BRIEF DESCRIPTION OF THE DRAWINGS

The detailed description of the drawings particularly refers to the accompanying figures in which.

FIG. 19a is an inside view of a disassembled waterproof case;

FIG. 19b is an external view of top plate;

FIG. 19c is a side view of top plate;

FIG. 19d is an inside view of top plate;

FIG. 19e is clear screen;

FIG. 20a is an external view of bottom plate;

FIG. 20b is an internal view of bottom plate; and

FIG. 20c is a side view of bottom plate.

DETAILED DESCRIPTION OF THE DRAWINGS

The embodiments of the invention described herein are not intended to be exhaustive or to limit the invention to precise forms disclosed. Rather, the embodiments selected for description have been chosen to enable one skilled in the art to practice the invention.

Figure 1:
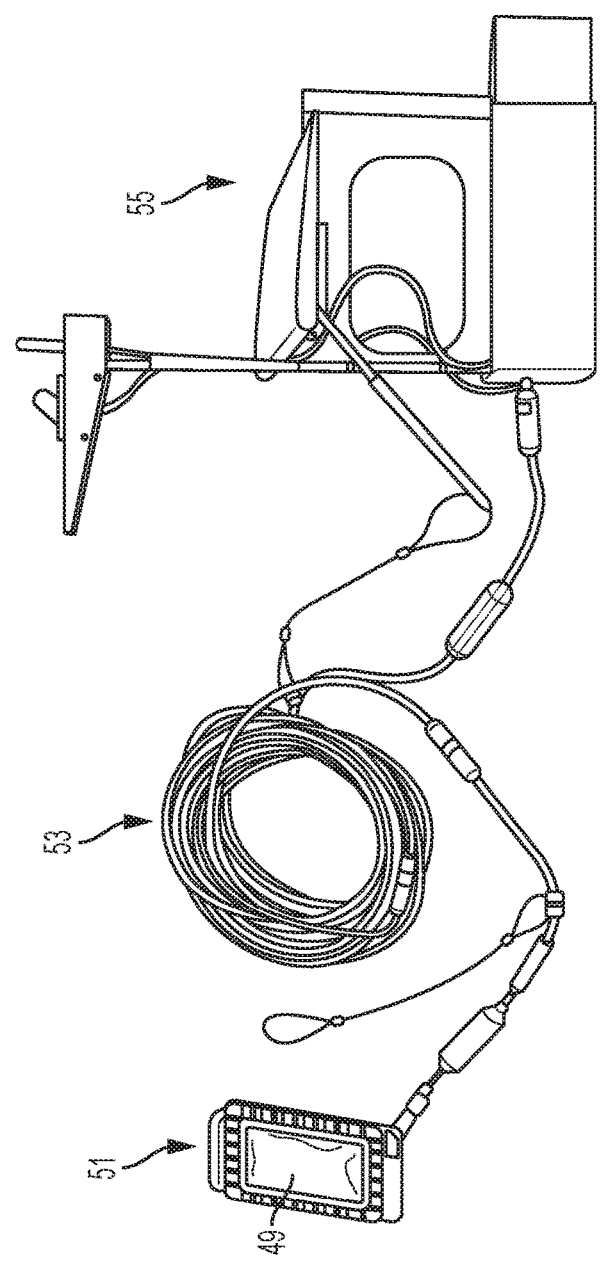
FIG. 1 is the entire system of the present invention, as would be used in an exemplary field of operation.

Referring initially to FIG. 1, the entire system of the present invention, as would be used in an exemplary field of operation immersed in body of water 47 (not shown) with exemplary mobile device 49 in waterproof case 51 with connection to one end of cable 53. The other end of cable 53 can be connected to buoy 55. Cable 53 can be a water-resistant, flexible, and bondable cable. Waterproof case 51 seals and protects any exemplary mobile device and permits native operation, e.g., touch screen capabilities and button pressing.

Figure 2A:
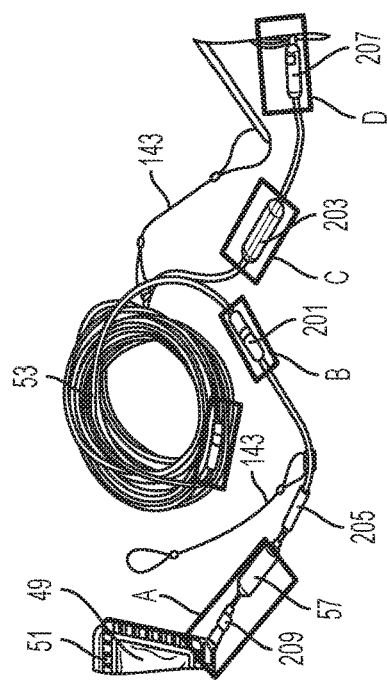
FIG. 2a is a diagram of cable components.

Referring to FIG. 2a, a diagram of cable components showing water-resistant micro USB converter 205 coupling exemplary mobile device 49 in waterproof case 51 to 6-pin cable 209. Micro USB converter provides electrical connection and power and noise regulation. Leftmost on 6-pin cable 209 can be a high depth high-pressure electrical connector between waterproof case 51 and 6-pin cable 209, micro USB connector 153 (not shown). Micro USB connector 153 (not shown) connects into the connection port of an exemplary mobile device 49 internal to waterproof case 51. Exemplary splices 201 couple pieces of cable 53 together and extend the length of cable 53 to a desired length that can be approximately commensurate with the depth at which exemplary mobile device 49 is to be operated. After splices 201 are added such that the length of cable 53 is extended to the desired length, power converter 203 is coupled near the end of cable 53 and converts the voltage of cable 53. The end of cable 53 is then coupled to external connector 57 which connects cable 53 to radio 59 (not shown) via 19-pin ethernet cable 207 and is water-resistant and can be an in-line connector, and flange-mounted. Small silver cable 143 provides string relief that takes the force structure off of the electrical connections and away from the phone on a safer part of the body of buoy 55 (not shown).

Figure 2B:
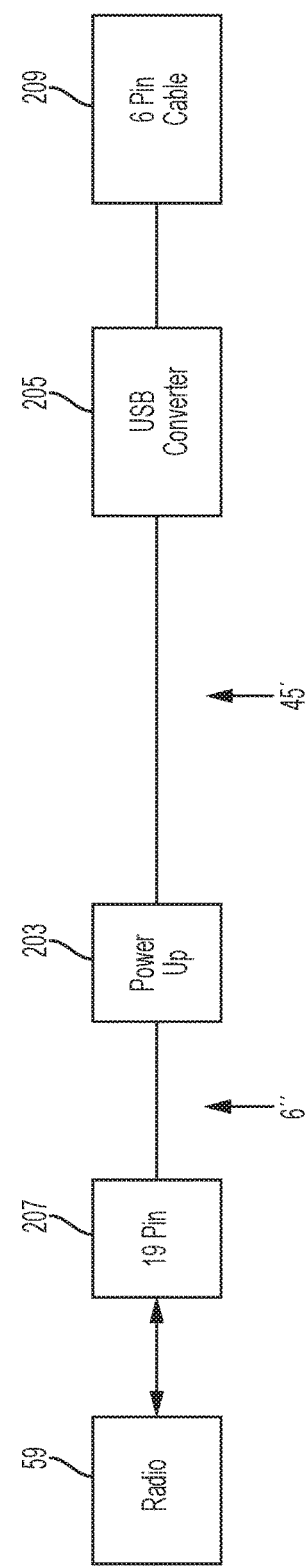
Referring to FIG. 2b, a schematic of cable components.

Referring to FIG. 2b, a schematic of cable components showing 6-pin cable 209 connected to USB converter 205, with cable 53 running between USB converter, e.g., at an exemplary length of about 45 feet. Cable 53 can be connected on the other end to power converter 203 which controls power conversion up conversion and is a processing module. Cable 53 continues out of power converter 203 on the opposite side, e.g., for about 6 inches. The other end of cable 53 is connected to 19-pin ethernet cable 207 which is connected to radio 59. 19-pin ethernet cable 207 provides electrical connection, noise filtering and is a bi-directional system. The right hand side of 19-pin ethernet cable 207 is the electrical connector that interfaces with radio 59. Cable 53 preferably has neutral buoyancy, low drag, and is slightly hydrophobic, flexible, lightweight, double shielded, twisted pair, at least category 5 (e.g., a category 5e ethernet cable), and can sustain at least about 650 lbs of pull force.

Figure 3:
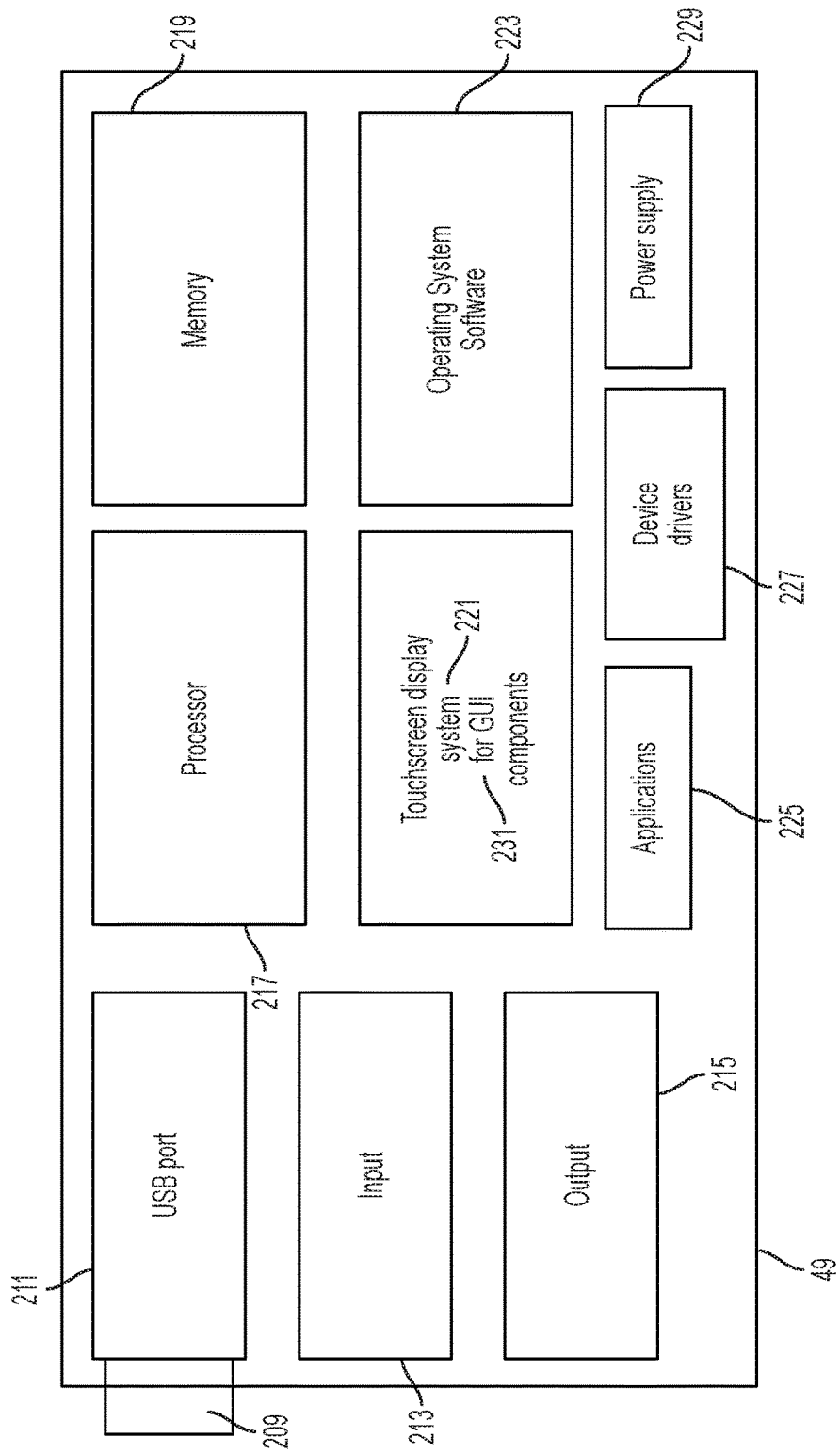
FIG. 3 is a functional block diagram of an exemplary mobile device.

Referring to FIG. 3, a functional block diagram of exemplary mobile device 49 showing the necessary components of an exemplary mobile device used in the system of the present invention. Exemplary mobile device 49 has pathway for 6-pin cable 209 to enable connectivity to external cables, input 213, output 215, processor 217, memory 219, touchscreen display system 221 for graphical user interface components 231, operating system software 223, applications 225, device drivers 227 and power supply 229. Touchscreen display system 221 responds to electromagnetic induction technology, or magnetic response generated by an exemplary specialized stylus (e.g., an S-pen stylus) utilized to interact with touchscreen display system 221 by means of digitizers incorporated in touchscreen display system 221. This touchscreen display system technology is for example referred to in U.S. Pat. No. 5,693,914, which is incorporated herein by reference. When alternative exemplary mobile devices 49 are to be used, an alternative stylus may be substituted for an exemplary specialized stylus to achieve full touchscreen functionality that may or may not require digitizers incorporated in touchscreen display system 221.

Figure 4:
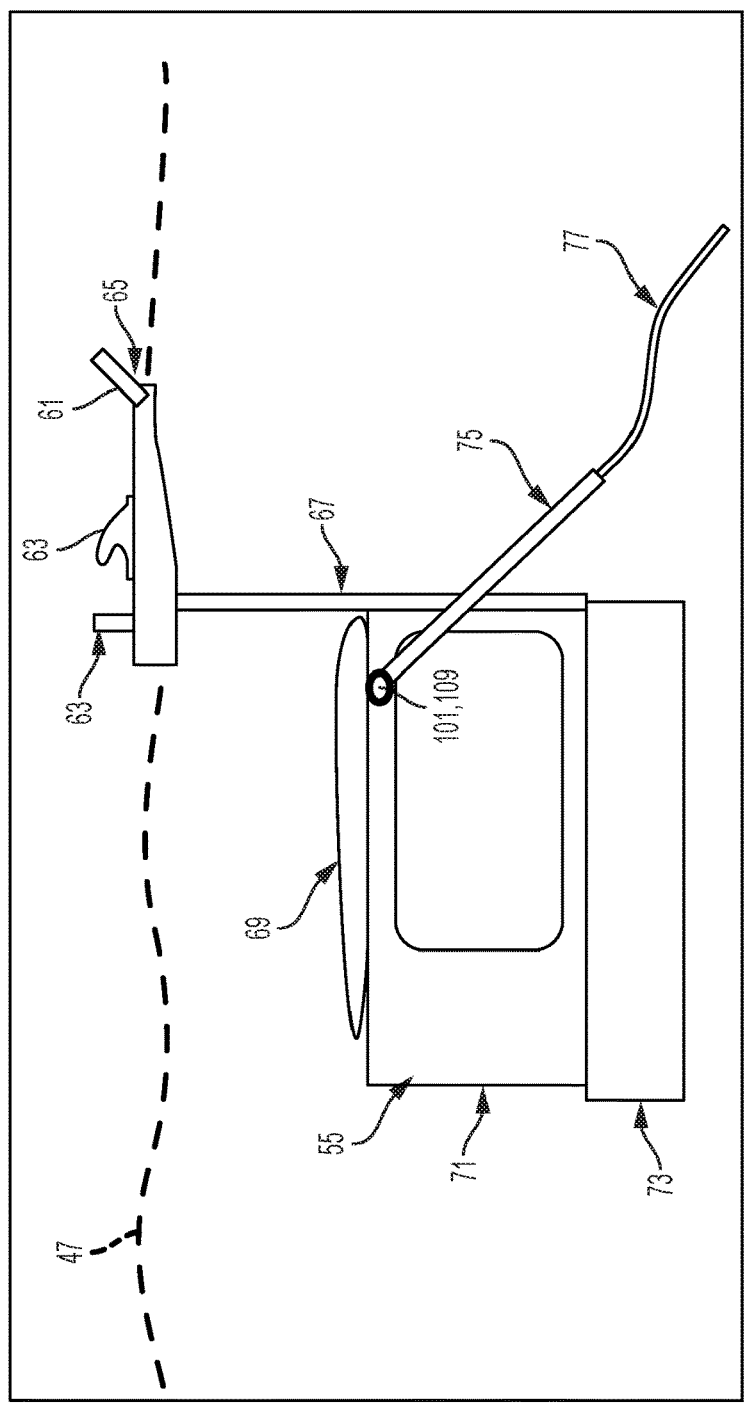
FIG. 4 is a side view of buoy.

Referring to FIG. 4, a side view of buoy 55 immersed in body of water 47 with antennae 63 and deck 65 above or at the surface of the water. Deck 65 is statically fixed to upright mast 67. Upright mast 67 is positioned just below the surface of the water, supporting deck 65 and it is connected securely to body 71. Wing 69 is statically coupled horizontally on top of body 71 and radio box 73 is coupled under body 71 at the bottom of buoy 55. Pull bar 75 can be affixed to body 71 in multiple locations traversing horizontally along body 71, and tether 77 comes out of pull bar 75. Tether 77 can be connected to a diver. Buoy 55 provides a stable platform to support radio box 73 containing radio 59 (not shown) and antennae 63 that connect by cable 53 (not shown) to mobile device 49 (not shown) underwater thereby allowing various cable-enabled capabilities, e.g., navigation and communication. Deck 65 supports antennae 63 such that antennae 63 stays above water no less than 95% of the time. Deck 65 has baffle 61 which is bent up, preferably to about 20 degrees. Baffle 61 prevents water from flowing over deck 65 at low speeds and prevents sheeting of water over antennae 63 at higher speeds. Baffle 61 minimizes drag in addition to keeping splash down. About half of deck 65 can be out of the water when buoy 55 is stationary, and deck 65 can be roughly level with the water when buoy 55 is not moving. Deck 65 is maintained just above the surface of the water through the buoyancy of deck 65 and of wing 69. The buoyancy of wing 69 and deck 65 are sufficient to keep radio box 73 and other components at a stable level in the water. Deck 65 in particular acts as a deflector and buoyancy manipulator, producing repellant drag and correction. For example, when deck 65 hits the water, it pulls the system back up. The buoyancy of the system of the present invention can be positive, neutral or negative depending on the forces being exerted on buoy 55 (see FIG. 6).

Radio box 73 provides an area where radio 59 (not shown) and other items can be inserted. For example, radio box 73 additionally can have a phone ballast to make sure that radio 59 (not shown) does not move around or it could be filled with foam to reduce the sound of radio 59 (not shown), and to decrease the weight of the system and to increase buoyancy. The weight of radio box 73 with radio 59 (not shown) and other items have sufficient weight such that in combination, these provide for a self-correcting buoy system that can balance the system at varying depths and further prevent the system from not tipping over onto its side. Exemplary cables run from radio 59 (not shown) up upright mast 67 to antennae 63 supported by deck 65. Antennae 63 are kept just above the surface of the water, preferably over 95% of the time that buoy 55 is immersed in body of water 47, so that they can continue to communicate signals to radio 59 (not shown). Antennae 63 link up to a transceiver that simultaneously receives and transmits data. Antennae 63 further preferably enable connection to exemplary mobile ad hoc networks. Body 71 of buoy 55 allows for the placement of radio box 73 at a depth below the center of buoyancy of buoy 55 and upright mast 67 keeps deck 65 at a height above the center of buoyancy of buoy 55. Body 71 also allows for the connection of pull bar 75. Pull bar 75 can freely pivot, via an exemplary hinge feature, preferably enabled by exemplary push lock retaining pin 101 fitting through exemplary hole 109. The exemplary hinge feature enables the angle of pull bar 75 to change depending on the depth of the diver in relation to the surface of the water and can be adjustable (see FIG. 9) to change the lift-drag dynamics and to accentuate wing 69 up to max speed.

In one exemplary embodiment of the present invention, buoy 55 is designed to be preferably pulled at speeds of up to 4 knots with a pull angle of 0 to 45 degrees.

In another exemplary embodiment of the present invention, buoy 55 has static stability such that the center of buoyancy is directly above the center of gravity, keeping buoy 55 upright when it is not moving or is moving at speeds less than 1 knot.

In yet another exemplary embodiment of the present invention, antennae 63, though preferably for radio 59 (not shown) connectivity to ethernet, GPS, and communications, can alternatively be configured to serve other functionality requirements for a variety of exemplary mobile devices 49 (not shown) utilized by an operator.

Figure 5:
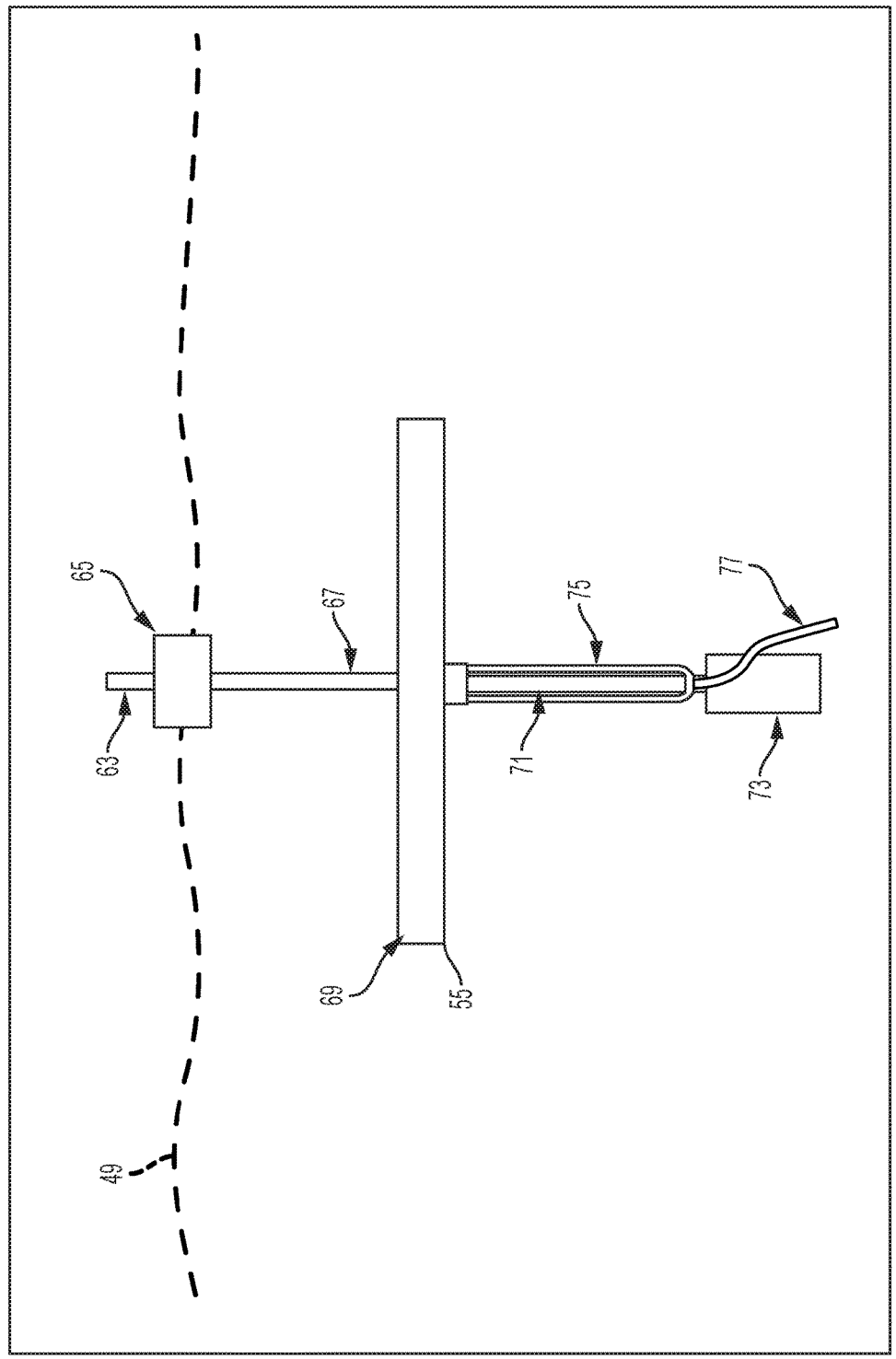
FIG. 5 is a front view of buoy.

Referring to FIG. 5, a front view of buoy 55 with constituent components antennas 63, just above deck 65 both held up by upright mast 67 and wing 69 which functions as stabilizing buoy 55. Below wing 69 is body 71 and pull bar 75 affixed to body 71 with radio box 73, situated right below body 71. Tether 77 runs through pull bar 75. It is intended that pulling tether 77 to the left or to the right will change the direction that buoy 55 is being pulled. Pull bar 75 is rigid to facilitate this exemplary directionality of buoy 55. Deck 65 can have positive buoyancy to balance out buoyancy of the other components of buoy 55.

Figure 6:
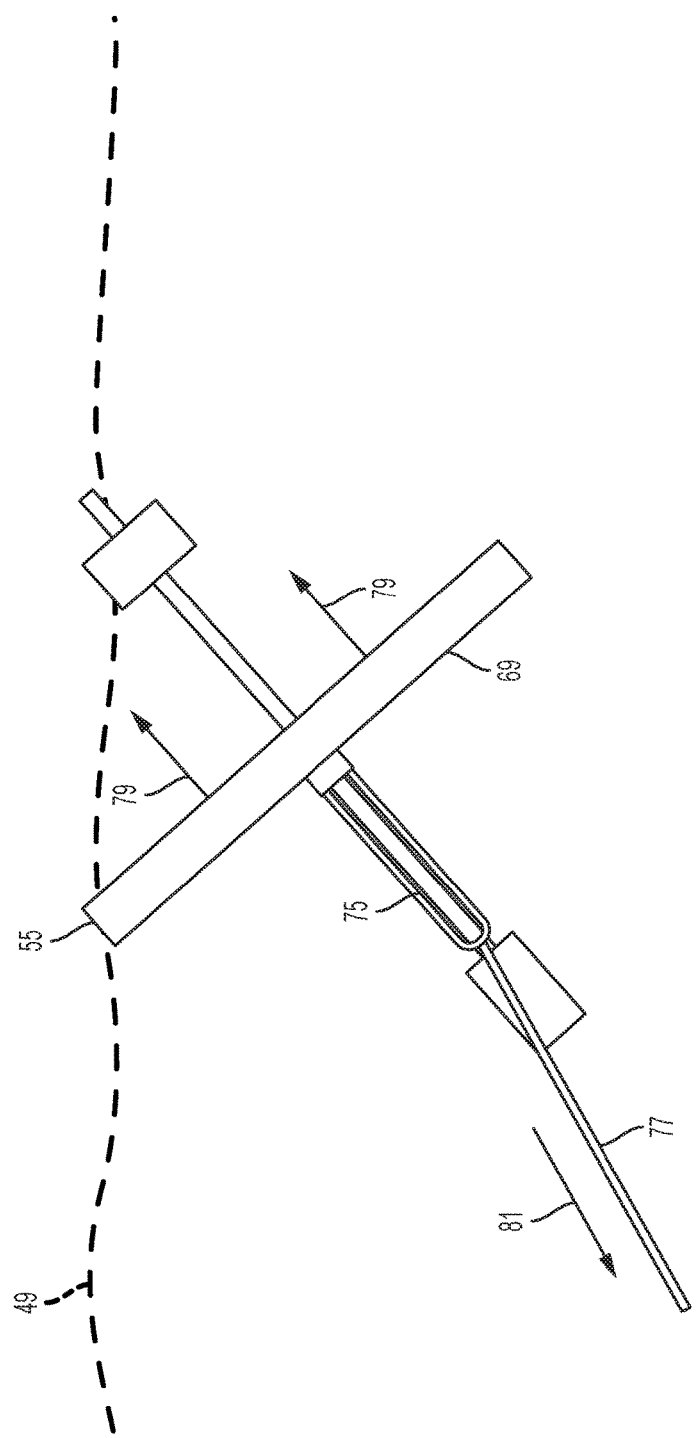
FIG. 6 is a front view of buoy showing exemplary lift forces.

Referring to FIG. 6, a front view of buoy 55 showing exemplary lift forces 79 when tether 77 exerts a tension force 81 on buoy 55. In one exemplary embodiment of the present invention, wing 69 stays completely underwater to provide exemplary lift forces 79 when buoy 55 is moving. Generally, deck 65 can have neutral buoyancy at one water line, which ensures that the water line stays at deck 65. Arrangement of wing 69 and deck 65 can also provide negative feedback on exemplary lift forces 79 of wing 69, and this keeps wing 69 at a constant depth. When deck 65 begins to submerge, positive buoyancy is exhibited, e.g., exemplary lift forces 79 counter tension force 81 exerted by tether 77. When deck 65 is too low in the water, buoyancy and hydrodynamic lift cause deck 65 to rise, and levels the angle of wing 69 to the horizontal, lifting buoy 55 higher. Similarly, when deck 65 gets too high out of the water, negative buoyancy is exhibited, e.g., gravity causes buoy 55 to tilt forward, and this causes the angle of wing 69 to drop toward the vertical. Pull bar 75 pivots below wing 69. Pull bar 75 has a variable pitch angle that modifies wing 69. Via pull bar 75, a pull force (not shown) passes through an exemplary center of lift and through the center of buoyancy of wing 69. Thus, differences in pull angle do not greatly affect the stability of buoy 55. The positive, neutral, and negative buoyancy forces of the system maintains the system at a stable depth when at rest, and when under dynamic load, e.g., when it is being pulled and dragged forward. Buoyancy of the system is a function of lift and transit. The buoyancy of the present invention works via wing 69 which provides lift and drag, based on the angle of the pull established, e.g., lift is provided when there is a forward force and drag is provided when there is a backward force. Critical to the buoyancy of buoy 55 is that the weight is minimized, the structural strength is maximized and the system is balanced. These elements in combination with the components described herein right the structure of buoy 55.

Figure 7:
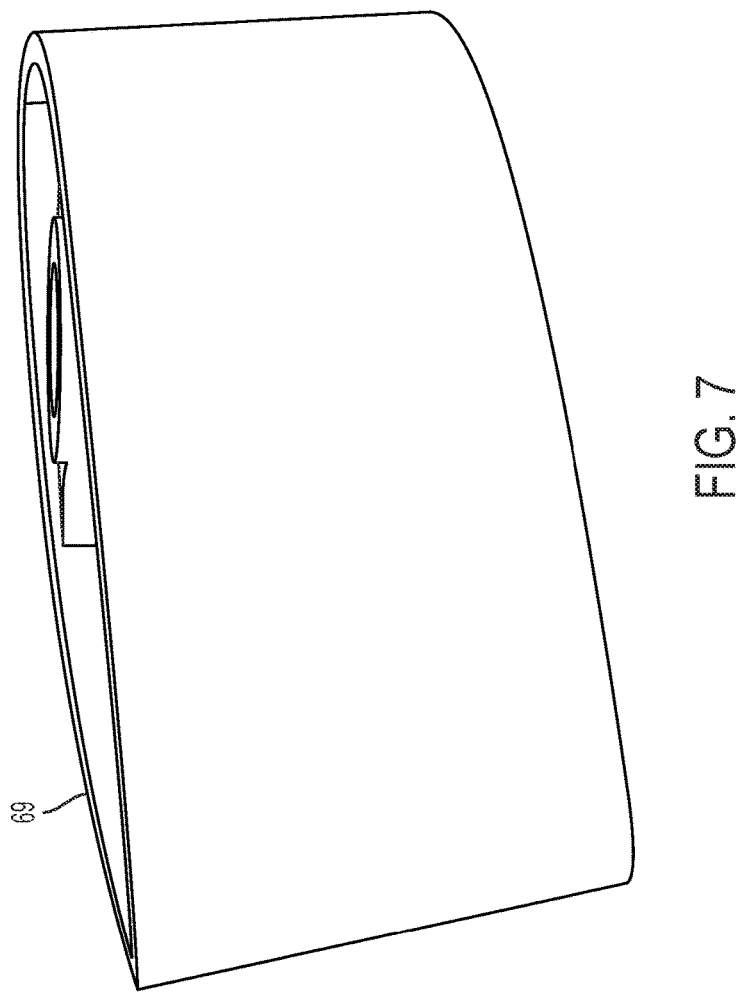
FIG. 7 is a perspective view of wing.

Referring to FIG. 7, a perspective view of wing 69. Wing 69 provides lift and drag, not buoyancy. The shape of wing 69 allows for it to correct for lift as buoy 55 is pulled through the water. Wing 69 is a hydrodynamic shape created from carbon fiberglass covered honeycomb composite, and the component is large for neutral buoyancy, and lightweight. The hydrodynamic shape of wing 69 provides lift (See FIG. 4) to keep buoy 55 level in the water and to prevent it from going underwater as buoy 55 begins to move.

Figure 8:
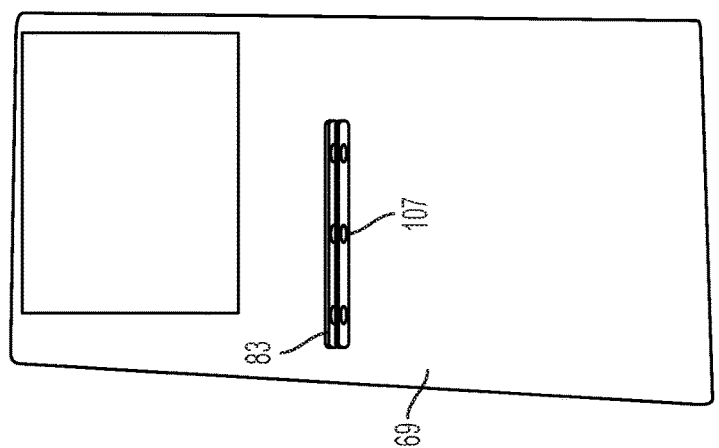
FIG. 8 is a bottom view of wing of FIG. 8.

Referring to FIG. 8, a bottom view of wing 69 of FIG. 5, showing wing 69 with exemplary wing bracket 83 affixed to wing 69 for connection to body 71 (not shown). Exemplary wing bracket 83 has two ledges with slots 107 opposite each other where body 71 (not shown) slides into and where preferably screws 85 (see FIG. 9) can be used to affix wing 69 to body 71 (not shown).

Figure 9:
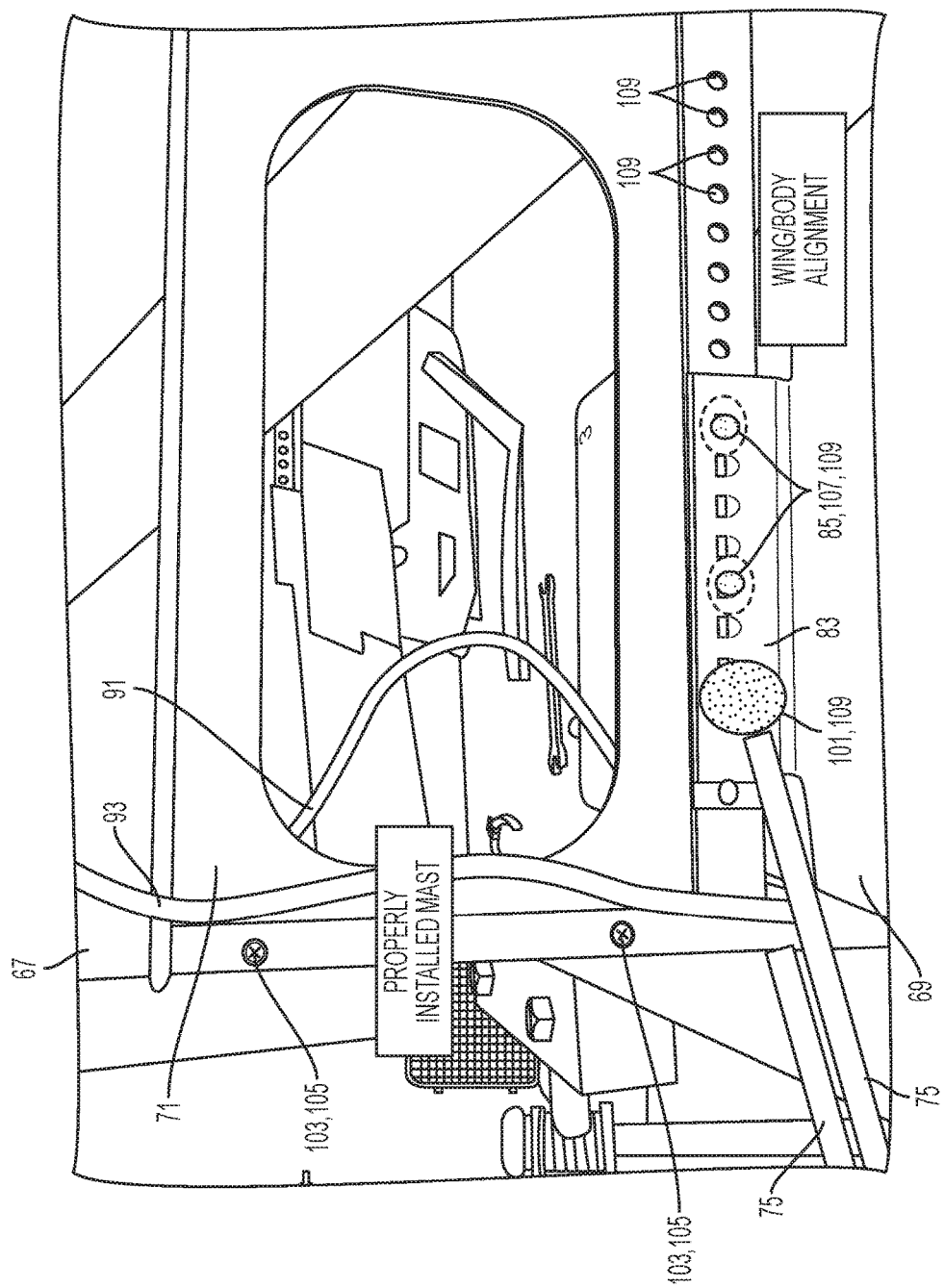
FIG. 9 is the preferred installed mast and wing/body alignment and the preferred pull bar location.
Figure 10B:
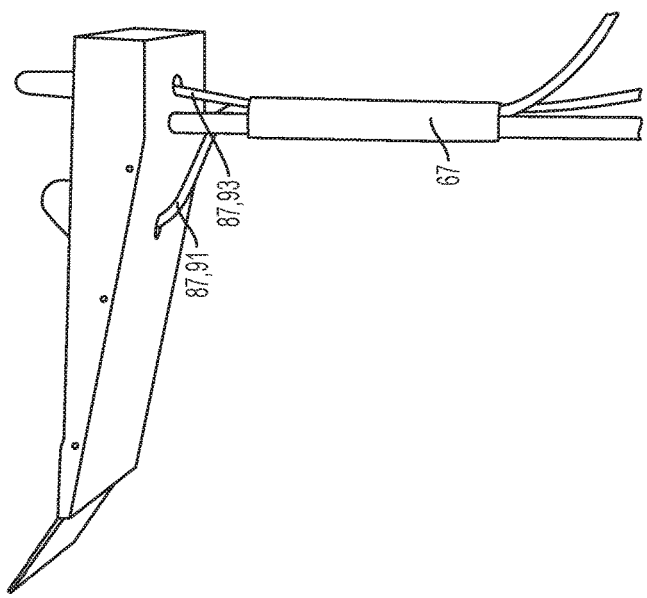
FIG. 10b is the cable routing coming from deck and running down upright mast.
Figure 10A:
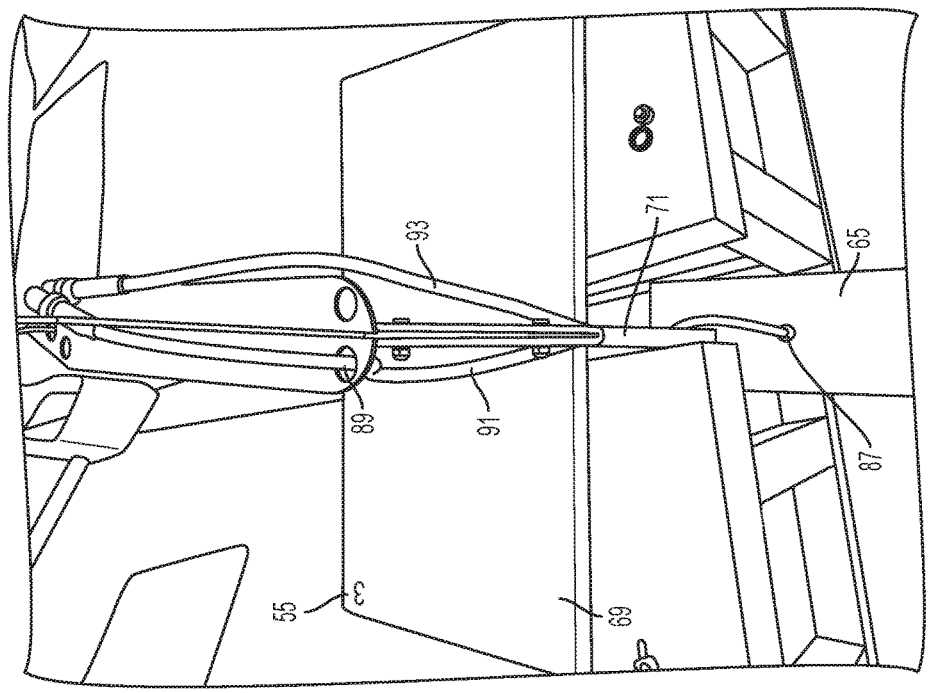
FIG. 10a is the preferred cable routing prior to radio installation.
Figure 11:
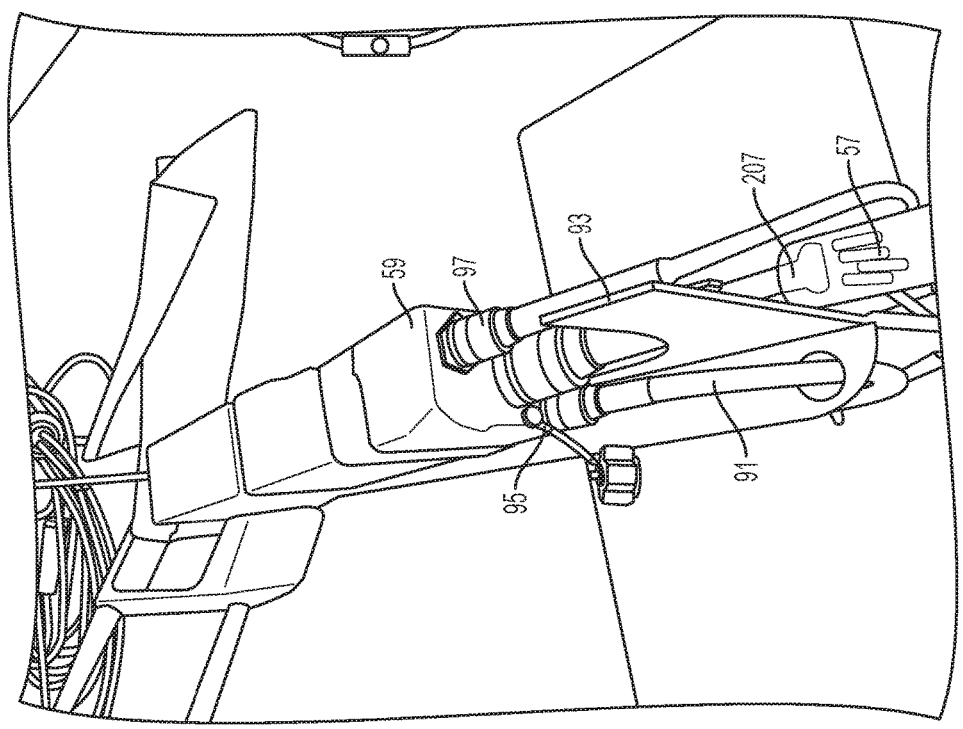
FIG. 11 is the preferred cable routing prior to payload cover replacement.

FIGS. 9-11 are views from the bottom of wing 69. Referring to FIG. 9, the preferred installation location to preferably rigidly coupled upright mast 67, wing 69, and body 71. Installed upright mast 67, wing 69, and body 71 are oriented at mutually perpendicular orientations relative to the other. Body 71 is coupled to wing 69 on a top edge of body 71. Body 71 is independently coupled to upright mast 67 on a front edge of body 71. Wing 69 and body 71 can be coupled by body 71 slipping into wing bracket 83 with slots 107 in wing bracket 83 aligning with exemplary holes 109 in body 71 whereby wing 69 and body 71 can be coupled, preferably using exemplary screws and locknuts 85 on the bottom edge of body 71. Preferably, to install upright mast 67 onto body 71, the bottom half of upright mast 67 is split. The split bottom end of upright mast 67 slips over the front edge of body 71. Upright mast 67 can be aligned with alignment holes 103 in body 71. Upright mast 67 and body 71 are coupled preferably using a second set of screws and locknuts 105, through alignment holes 103. Exemplary RF cables are also shown, GPS cable 91, and communications cable 93.

FIG. 9 also shows the preferred pull bar 75 installation location, below wing 69. Pull bar 75 can be preferably coupled to body 71 via exemplary push lock retaining pin 101 fitting through one of a plurality of exemplary holes 109 in body 71, and can be fitted through slots 107 aligning with one of a plurality of exemplary holes 109 in body 71. Pull bar 75 can be connected to body 71 via a plurality of possible hinge points near wing 69, shown as a plurality of exemplary holes 109. Adjustment of the hinge point location of pull bar 75 requires horizontally traversing to another of plurality of exemplary holes 109 along body 71. Similarly, the installation location of wing 69 can also be adjusted via plurality of exemplary holes 109 being horizontally traversed along body 71. Preferably, exemplary push lock retaining pin 101 couples wing 69 to body 71, concurrent to affixing pull bar 75 to wing 69 and to body 71. Adjusting the location of pull bar 75 and/or wing 69 via modification of the hinge point connection chosen, e.g., selecting a different one of plurality of exemplary holes 109, can change the lift and drag for different diver lengths and depths. This ability to adjust the location of pull bar 75 and/or wing 69 is critical to performance of buoy 55 because it allows the system to be adjusted so that it is in balance at varying depths. Exemplary push lock retaining pin 101 allows pull bar 75 to freely pivot around on a vertical axis. The angle of pull bar 75 changes depending on the depth of the diver in relation to the surface of the water and the resulting forces being exerted on pull bar 75.

Referring to FIG. 10*a*, the preferred cable routing prior to radio 59 (not shown) installation, proper cable routing is required for buoy 55 to fly correctly through the water. Buoy 55 is propped upside down and held by wing 69 to show the preferred cable routing. Referring to FIG. 10*b*, the cable routing coming from deck 65 and running down upright mast 67 where GPS cable 91, and communications cable 93 from antennas 63 (see FIG. 5) pass through holes 87 at the bottom of deck 65, and are affixed to upright mast 67. Referring back to FIG. 10*a*, GPS cable 91 runs through a second hole 89 on the bottom of body 71 thus affixing to body 71 of buoy 55.

Referring to FIG. 11, the preferred cable routing prior to radio box 73 (not shown) replacement where radio 59 allows for GPS and communications with the tablets or cell phones in the field. The present invention enables use of these implements underwater. Radio 59 is required for full underwater mobile device functionality. GPS cables 91, and communications cable 93 connect to ports 95, 97 in radio 59. External connector 57 connected to 19-pin ethernet cable 207 of cable 53 (not shown) is also connected to radio 59 and will be described more thoroughly below.

Figure 12:
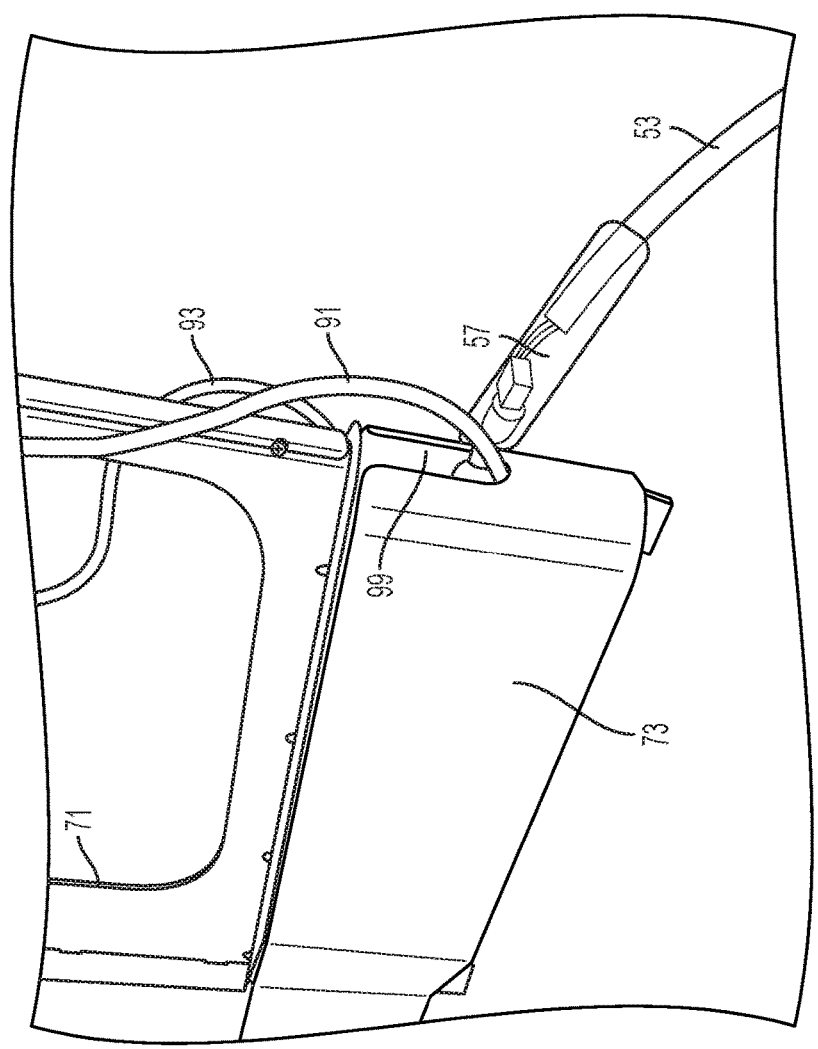
FIG. 12 is the preferred cable routing through payload cover.

Referring to FIG. 12, the preferred cable routing through radio box 73 is shown. External connector 57 allows connection to cable 53 and runs through a front slot 99 in radio box 73. Communications cable 93 also runs through front slot 99. GPS cable 91 is affixed to the side of body 71 as described above. Cable 53 runs from radio 59 (internal to radio box 73) to underwater mobile device 49 (not shown).

Figure 13:
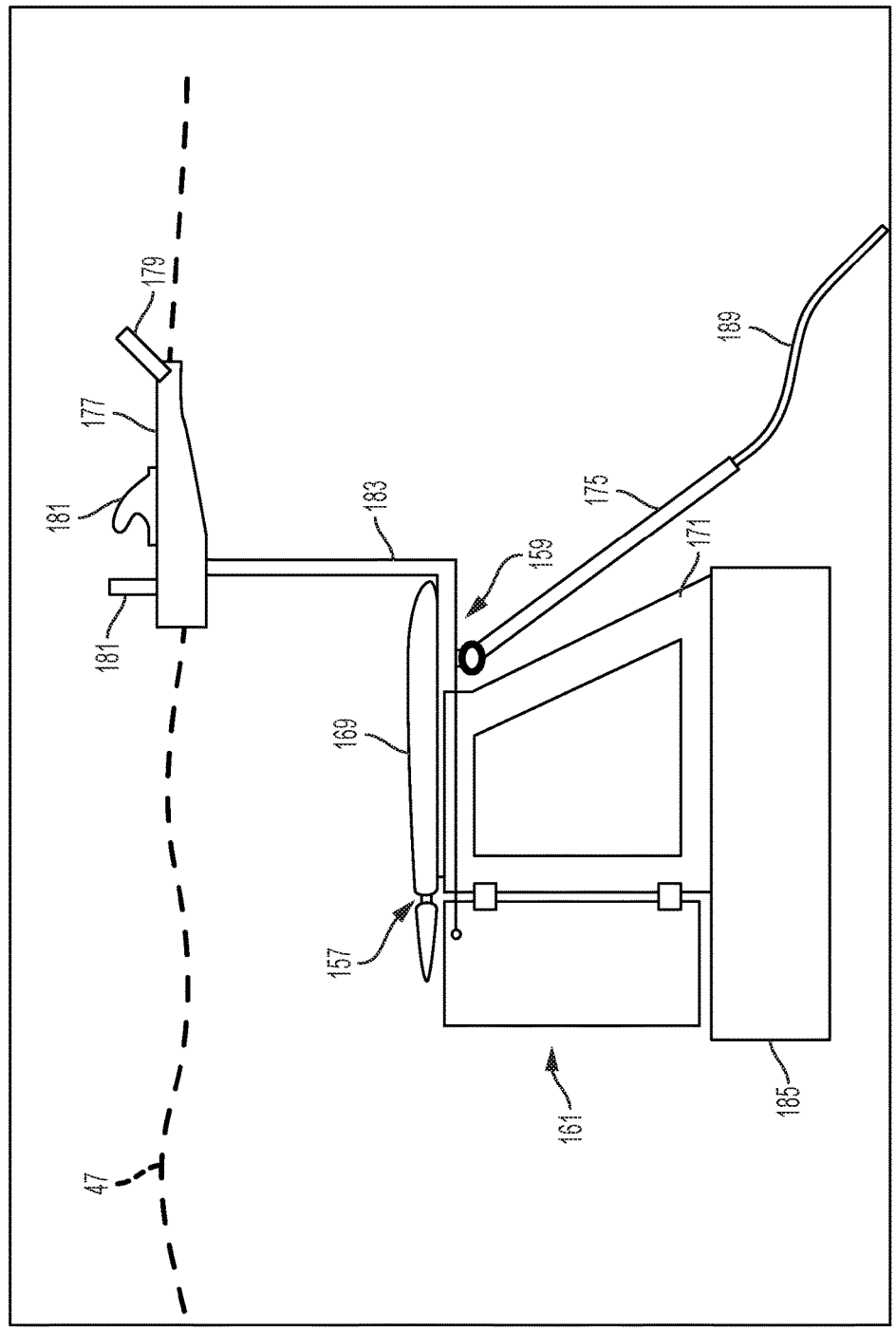
FIG. 13 is an alternative embodiment of buoy.

Referring to FIG. 13, an alternate embodiment buoy 155 immersed in body of water 47. Alternate embodiment buoy 155 is designed for travel through body of water 47 at higher speeds than buoy 55 is capable of. In addition to the features described above for buoy 55 (not shown), e.g., deck 177, baffle 179, antennae 181, mast 183, body 171, radio box 185 with exemplary radio 187 (not shown), and tether 189, alternate embodiment buoy 155 additionally has: trailing edge pivot 157, movable rudder 161, and pull bar pivot 159. Pull bar pivot 159 allows pull bar 175 to swing from side to side as well as front to back, decreasing the ability of buoy 155 to flip. This change necessitates a change in the shape of body 171 to accommodate the increased range of motion of pull bar 175. Movable rudder 161 allows left and right motion such that pulling to the right causes movable rudder 161 to steer buoy 155 to the right. Trailing edge pivot 157 adjusts the pitch of each half of wing 169, causing buoy 155 to bank left when it is pulled left. Alternate embodiment buoy 155 provides stability for travelling at greater speeds than buoy 55 is capable of, where stability is defined as keeping antennae 181 above the surface of the water, preferably over than 95% of the time that alternative buoy 155 is in operation immersed in body of water 47. Antennae 181 are preferably for radio 187 (not shown) connectivity to ethernet, GPS, and communication, but can be reconfigured or replaced to serve alternative functionality requirements for a variety of exemplary mobile devices 49 (not shown) utilized by an operator. Antennae 181 link up to a transceiver that simultaneously receives and transmits data. Antennae 181 further preferably enable connection to exemplary mobile ad hoc networks.

Figure 14:
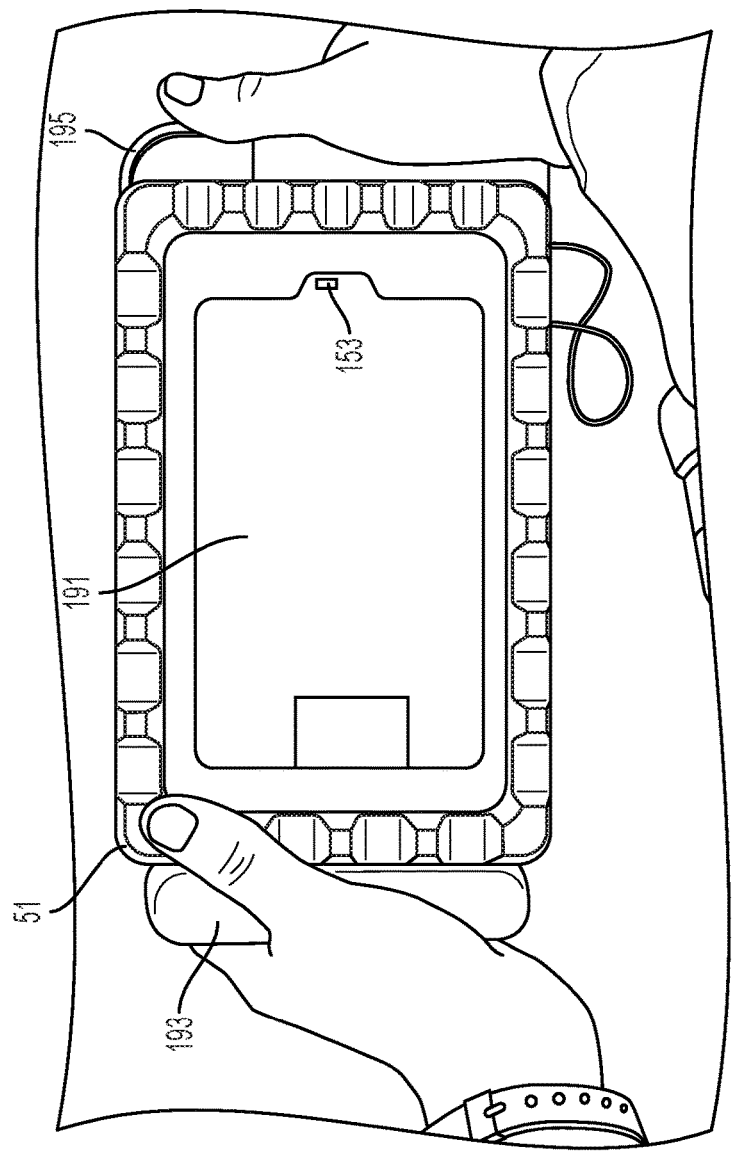
FIG. 14 is a front view of a fully assembled waterproof case.

Referring to FIG. 14, a front view of a fully assembled waterproof case 51 showing handle 193 on the left end of waterproof case 51 and loop 195 on the top right corner of waterproof case 51, preferably for carbiner lock-in. Waterproof case 51 encapsulates an exemplary mobile device 49 (not shown) in a waterproof encasement that is resistant to both the pressure forces exhibited at diving depths exceeding about 100 feet, and resistant to the corrosive environment of the ocean, while preserving the full functionality of exemplary mobile device 49 (not shown). In addition to sealing and protecting an exemplary mobile device 49 (not shown), waterproof case 51 permits native operation such as touch screen operation and button pushing using an exemplary stylus (not shown) when functionality at depths greater than about 10 feet is required. Up to about 10 feet waterproof case enables use of exemplary mobile device 49 (not shown) with an exemplary operator's finger. When an exemplary mobile device 49 (not shown) is inserted into waterproof case 51, the interior of waterproof case 51 can be cleaned, preferably with isopropyl alcohol. Micro USB connector 153 of FIG. 2 is plugged into exemplary mobile device 49 (not shown) and exemplary mobile device 49 (not shown) is laid down onto clear screen 191 of FIG. 19*e* with touchscreen facing clear screen 191. Exemplary mobile device 49 can be optimally slid towards the opposite end of the case from micro USB connector 153 to ensure easiest access once case is assembled to an exemplary home button on exemplary mobile device 49.

In one exemplary embodiment of the present invention, in addition to clear screen 191, waterproof case 51 can have a window in the back for taking pictures with an exemplary mobile device 49 (not shown).

Important to the design of waterproof case 51 was making sure that an exemplary mobile device contained within the waterproof case 51 not would not crush itself at the exemplary operational depths, e.g., exceeding about 100 feet, but also would neither corrode or dissolve in an exemplary ionic oceanic environment. To achieve this, alloy and material selection based on the electronegativity between the case and the ocean was critical. Special paints were selected and the waterproof case 51 was allodined to protect from additional corrosion. Also critical to the design of waterproof case 51 was functionality and usability as further described below.

Figure 15:
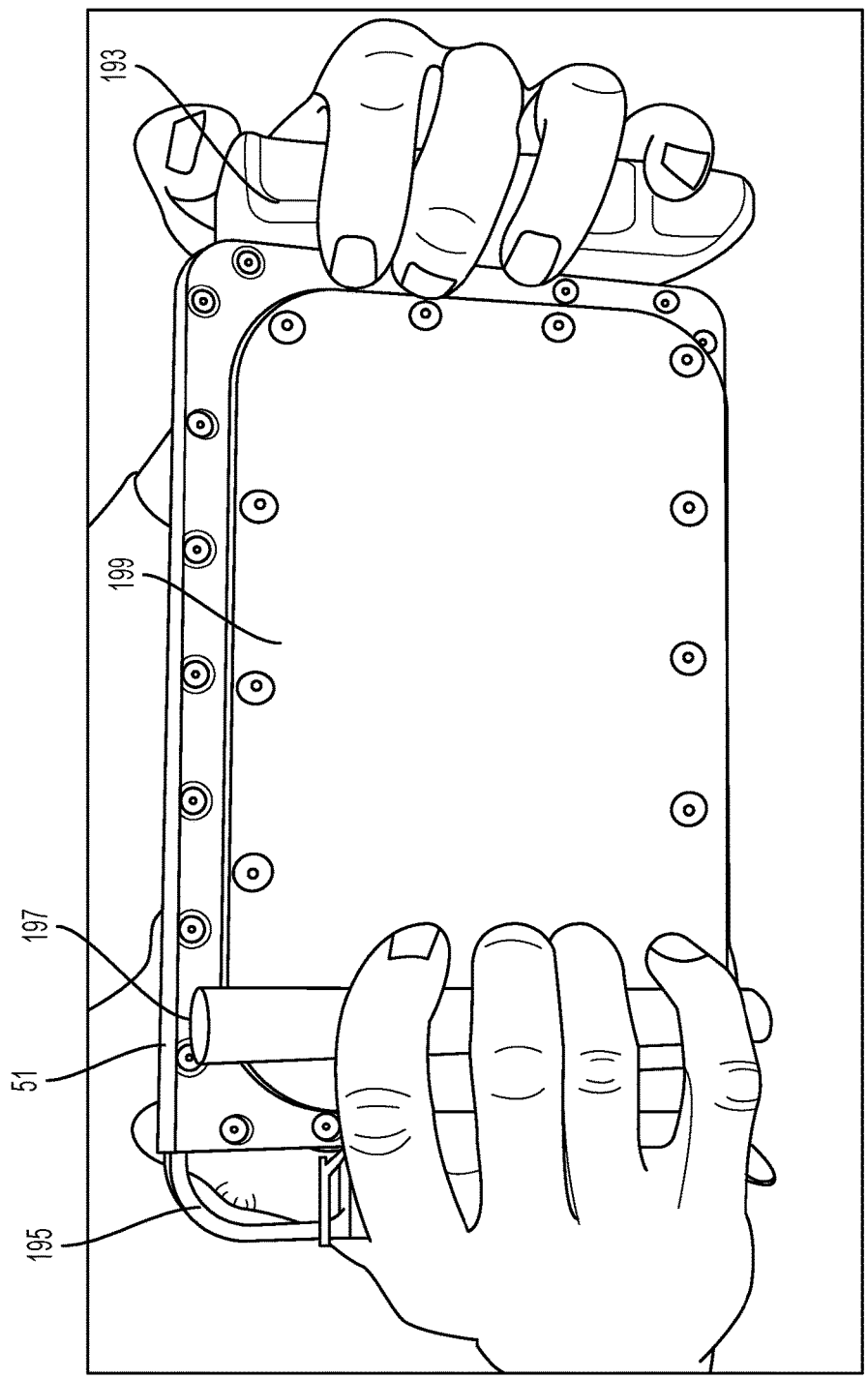
FIG. 15 is a back view of a fully assembled waterproof case.

Referring to FIG. 15, a back view of a fully assembled waterproof case 51 showing handle 193 which aids in gripping waterproof case 51 and loop 195. Also, stylus case 197 can be attached to the back of waterproof case 51, and bottom plate 199 which is coupled to the body of waterproof case 51, e.g., via screws. An exemplary stylus in stylus case 197 should be watertight, e.g., preferably exemplary specialized stylus 145 (not shown).

Figure 16:
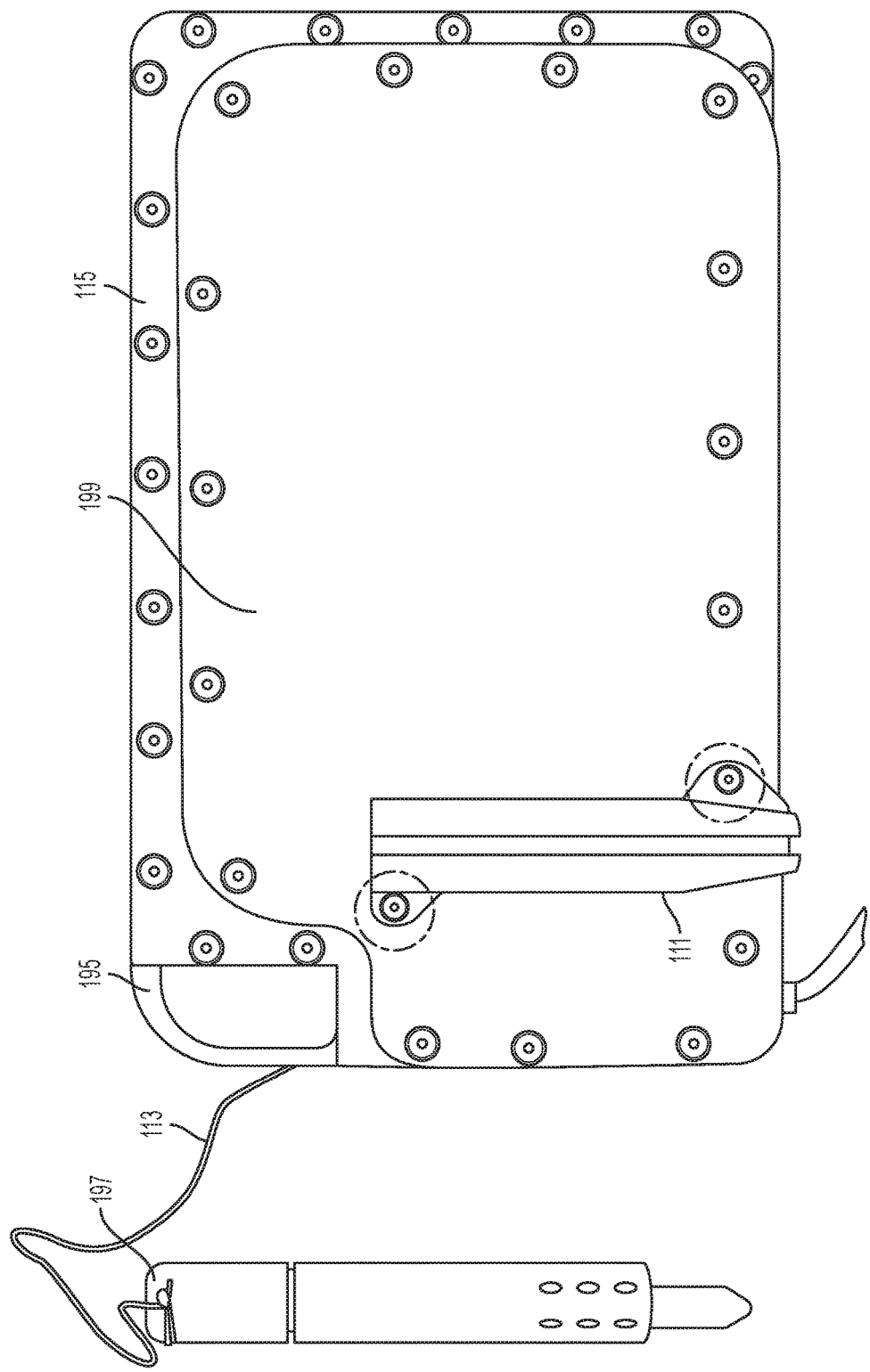
FIG. 16 is a back view of waterproof case with disassembled back plate.

FIG. 16 is a back view of disassembled back plate 115 of waterproof case 51 with bottom plate 199 with holster 111 coupled to bottom plate 199, preferably via screws. Stylus case 197 fits into holster 111 where stylus case 197 preferably encases an exemplary touchscreen stylus device, e.g., preferably exemplary specialized stylus 145 (not shown). Loop 195 is shown with thread 113 tied onto it. The opposite end of thread 113 ties onto stylus case 197, securing stylus case 197 to waterproof case 51, when it is not secured within holster 111.

Figure 17A:
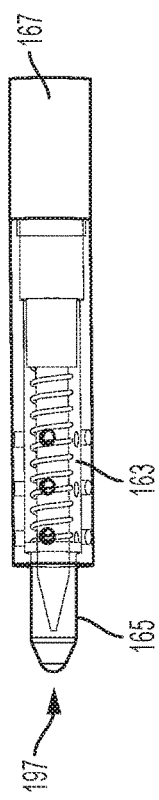
FIG. 17a is an assembled stylus case.

Referring to FIG. 17a, an assembled stylus case 197 with stylus cap 165, stylus tube 163, and stylus back-end cap 167.

Figure 17B:
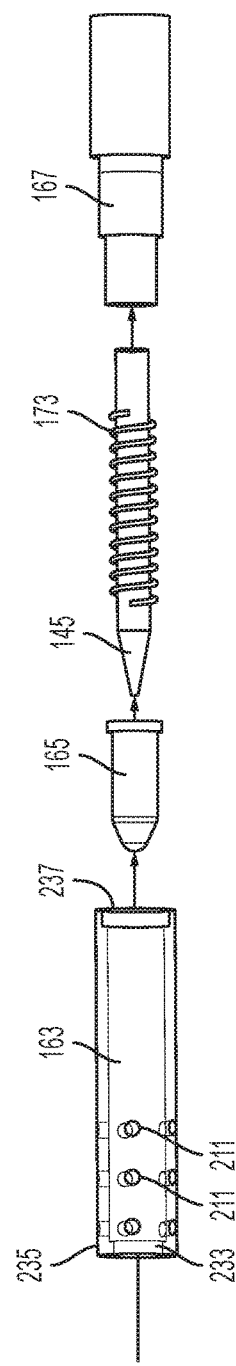
FIG. 17b is a disassembled stylus case.

Referring to FIG. 17b, a disassembled stylus case 197 with stylus tube 163 having a front end 235 and a back end 237, stylus cap 165, stylus back-end cap 167, exemplary specialized stylus 145, with spring 173. Stylus tube 163 has an internal hollow chamber, sized to accommodate stylus cap 165, exemplary specialized stylus 145, with spring 173, and stylus back-end cap 167. Stylus tube 163 has holes 211 which allow front end 235 of stylus case 197 to flood with an exemplary liquid to equalize the pressure on the inside of stylus case 197. Stylus tube 163 additionally has an exemplary divot 233 near front end 235 where there is a narrowing of the hollow internal chamber of stylus tube 163. Spring 173 slides onto and fits around exemplary specialized stylus 145. After spring 173 is slid onto exemplary specialized stylus 145, the back end of exemplary specialized stylus 145 fits into stylus back-end cap 167. Stylus cap 165 fits onto the writing end of specialized stylus 145.

Figure 17C:
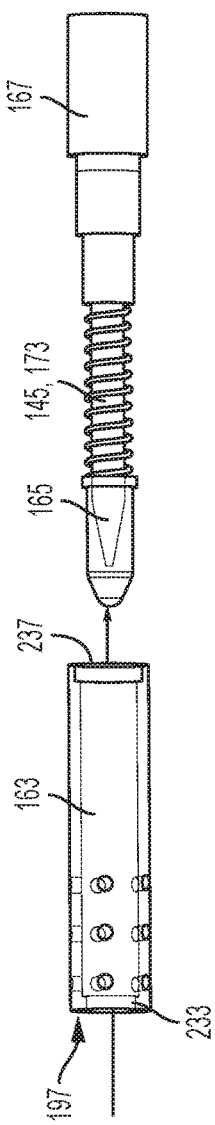
FIG. 17c is a partially assembled stylus case.

Referring to FIG. 17c, a partially assembled stylus case 197. The entire assembly of stylus cap 165, stylus back-end cap 167, exemplary specialized stylus 145, with spring 173 fits into stylus tube 163 from back end 237 of stylus tube 163. Stylus back-end cap 167 mates into stylus tube 163 from back end 237 of stylus tube 163 and can be coupled into back end 237 of stylus tube 163 preferably with glue. Other coupling means can also secure stylus back-end cap 167 to back end 237 of stylus tube 163, such as screwing, locking, clamping. Spring 173 pushes against front end 235 of stylus tube 163. The narrow width exemplary divot 233 stops cap 165 from exiting front end 235 of stylus tube 163. Stylus cap 165 is capable of moving inward and outward, e.g., responding to pressure exerted on stylus cap 165 and this is enabled by spring 173, which allows stylus cap 165 to recede inward within stylus tube 163 when more pressure is applied, and be about fully extended (touching divot 233) when less pressure is applied. Stylus cap 165 allows detection of an exemplary electromagnetic induction field that exemplary specialized stylus 145 generates to interact with the touchscreen of an exemplary mobile device (not shown), via an exemplary digitizer in the touchscreen. Stylus back-end cap 167 secures back end 237 of fully assembled stylus tube 163.

Figure 18B:
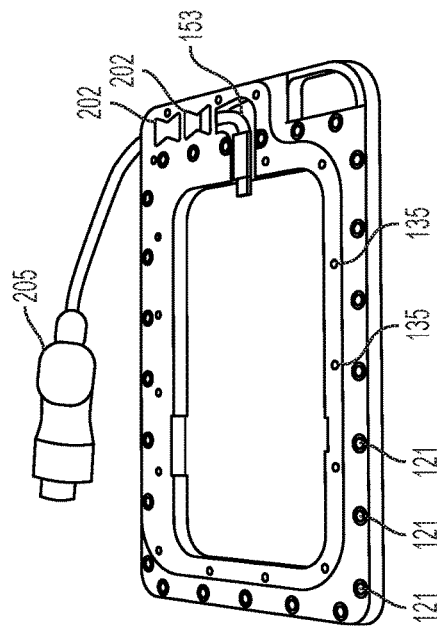
FIG. 18b is an internal view of midplate with reconfigurable mobile device connector.
Figure 18C:
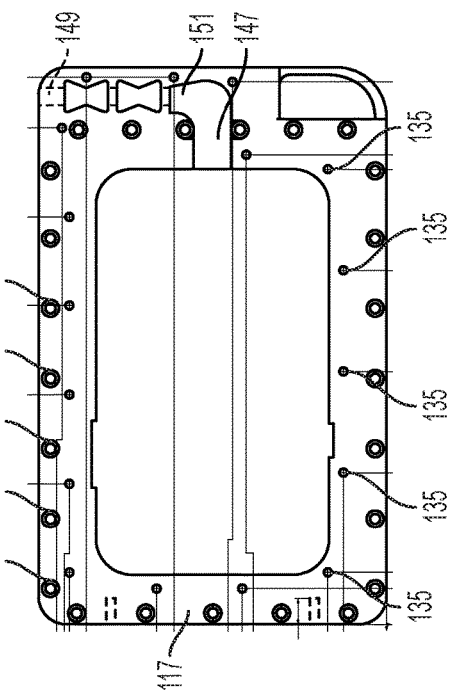
FIG. 18c is an internal view of a midplate showing serpentine area where exemplary connection cables can fit.
Figure 18A:
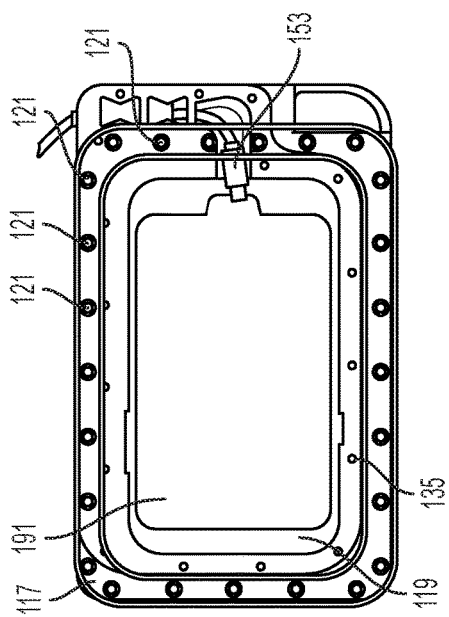
FIG. 18a is an inside view of a disassembled waterproof case with mid plate, silicone gasket and top plate gasket showing placement and assembly screws.

Referring to FIG. 18a, an inside view of a disassembled waterproof case 51 with mid plate 117, silicone gasket 119, clear screen 191, and top plate gasket 123 (not shown) showing placement and midplate exemplary assembly screw holes 121 where screws are affixed to couple mid plate 117, silicone gasket 119, clear screen 191 and top plate gasket 123 (not shown). Assembly of the components shown in FIG. 18a is described below. Midplate 117 of FIGS. 18a-c preferably has two sets of holes for exemplary screws. On an inner perimeter are midplate threaded holes 135, and on an outer perimeter are midplate exemplary assembly screw holes 121. The gaskets described above are mainly responsible for making waterproof case 51 watertight.

Referring to FIG. 18b, an internal view of midplate 117 with micro USB connector 205 which preferably can be a reconfigurable mobile device connector, enabling connectivity to a variety of exemplary mobile devices 49 (not shown). Access cavities 202 facilitate movement of micro USB connector 153.

Referring to FIG. 18c, an internal view of a midplate 117 showing a serpentine mechanical carbiner loop capable of housing electrical wire and electrical cable to provide full data throughput from the radio 59 to the exemplary mobile device 49 (not shown). Preferably, USB connectivity to exemplary mobile device 49 (not shown) is enabled via micro USB connector 153 seen in FIG. 18b, which winds through port 151 with port entry 149 and port exit 147.

Referring to FIG. 19a, an inside view of a disassembled waterproof case with silicone gasket 119 (which appears the same on both sides) on top of top plate gasket 123 of FIGS. 19b-d, with clear screen 191 of FIG. 19e sandwiched between silicone gasket 119 and top plate gasket 123. Silicone gasket 119 is coupled to the inside of clear screen 191, e.g., via gluing or other equivalent coupling means. Top plate gasket 123 is placed on the table with a smooth inside (see FIG. 19d) facing up, and coupled clear screen 191 and silicone gasket 119 are placed on top of top plate gasket 123 with clear screen 191 sandwiched between silicone gasket 119 and top plate gasket 123 as described above, with silicone gasket 119 on top of the assembly. Referring to assembly of the components seen in FIG. 18a, midplate 117 of FIG. 18b or 18c is placed on top of silicone gasket 119 (see FIG. 19a). Midplate exemplary assembly screw holes 121, silicone gasket exemplary assembly screw holes 127 (see FIG. 19a), clear screen exemplary assembly screw holes 131 (not shown) and top plate gasket exemplary assembly screw holes 129 (see FIG. 19d) are all aligned and the assembly of midplate 117, silicone gasket 119, clear screen 191 and top plate gasket 123 can be coupled together via exemplary screws, preferably tightened to about 50 in-ounces.

Referring to FIG. 19b, an external view of top plate gasket 123 showing exemplary castle ridges 125 for gripping the outside of waterproof case 51. Exemplary castle ridges 125 increase the functionality and usability of waterproof case 51 by enabling grip especially at high diving depths when divers might have cold fingers.

Referring to FIG. 19c, a side view of top plate gasket 123 showing more clearly the ruggedized exemplary castle ridges 125.

Referring to FIG. 19d, an inside view of top plate gasket 123. The inside of top plate gasket 123 can be preferably smooth for securing various components together and making waterproof case 51 watertight. Also shown are top plate gasket exemplary assembly screw holes 129.

Referring to FIG. 19e, clear screen 191. Clear screen 191 is a transparent cover that additionally functions as a touchscreen extender interface screen that allows an exemplary stylus to be used at all operational depths in the full oceanic environmental conditions. Clear screen 191 can be precut using a laser machine, and sized to accommodate exemplary mobile device 49 (not shown). Also not shown are clear screen exemplary assembly screw holes 131 which are along the perimeter of clear screen 191 and preferably match to top plate gasket exemplary assembly screw holes 129, silicone gasket exemplary assembly screw holes 127 and midplate exemplary assembly screw holes 121.

Referring to FIG. 20a, an external view of bottom plate 199. To attach bottom plate 199 to midplate 117, bottom plate threaded holes 137 are aligned with midplate threaded holes 135 (not shown, see FIG. 18a-c) and coupled together preferably using exemplary screws or other means to couple midplate 117 (not shown) to bottom plate 199. The exemplary screws can be preferably tightened to about 75 in-ounces. Once coupled, the exemplary screws should be rechecked to ascertain that they all have the required tension. Referring to FIGS. 20a-b, first exemplary bottom plate threaded hole 139 and second exemplary bottom plate threaded hole 141 are preferably where stylus case 197 (not shown) can be coupled to bottom plate 199 from the outside, see FIG. 20a. First exemplary bottom plate threaded hole 139 and second exemplary bottom plate threaded hole 141 also can align with midplate threaded holes 135 (not shown, see FIG. 18a-c) and coupled together preferably using exemplary screws or other means to couple midplate 117 (not shown), bottom plate 199, and stylus case 197 (not shown).

Referring to FIG. 20b, an internal view of bottom plate 199 with adhesive side of silicone material 133.

Referring to FIG. 20c, a side view of bottom plate 199.

In one exemplary embodiment of the present invention, removing an exemplary mobile device 49 simply requires the removal of back plate 199 by loosening and removing all exemplary screws of other coupling devices, removing the back plate 199, thereby allowing access to exemplary mobile device 49. Exemplary mobile device 49 can be tipped out of waterproof case 51, and its micro USB connector 153 can be unplugged. In another embodiment of the present invention, exemplary mobile device 49 can be exchanged for another identical device or an alternative device allowing connectivity via micro USB connector 153. In yet another embodiment of the present invention, micro USB connector 153 can be interchanged for another connector cable compatible with an alternate mobile device and the alternate mobile device can be used with full functionality in waterproof case 51. The described exemplary embodiments of the present invention regarding mobile device removal and replacement allow waterproof case 51 to host any number of exemplary mobile devices desired for use by an operator, to fit the needs of the operator.

In another exemplary embodiment of the present invention, a USB cable on the go connector could build a mesh network to other devices.

In yet another exemplary embodiment of the present invention, the cable and structure can be configured to support the evolution and utility of the present invention.

Although the invention has been described in detail with reference to certain preferred embodiments, variations and modifications exist within the spirit and scope of the invention as described and defined in the following claims.

What is claimed is:

1. An underwater mobile device system comprising:
a buoy immersed in a body of water, said buoy having a body substructure comprising:
  a deck maintained on a surface of water, having a buoyant shape, said deck supporting a plurality of antennas and keeping said plurality of antennas just above the surface of the water to make said system capable of continually communicating signals from the mobile device to a receiving device;
  a wing enabling buoyancy of said deck by correcting for lift forces as said buoy is pulled through the water, said wing having a hydrodynamic shape that levels said buoy and prevents said buoy from going underwater as it moves, said wing and said deck keeping said body substructure at a stable level in the water,
  an upright mast connecting said deck to said wing and connected to a body, said upright mast maintaining said deck above a center of buoyancy, said wing positioned perpendicular to said upright mast and over said body, said body vertically underneath said wing with a front end along said upright mast;
  a radio box supported underneath said body comprising a radio within said radio box, the radio enabling GPS and communications with the mobile device through a plurality of cables running from said plurality of antennas along said upright mast to the radio, wherein said plurality of antennas continually communicate signals sent from the radio;
  a pull bar connected to said body, said pull bar freely pivoting and allowing an angle of said pull bar to change depending on a distance between a diver and the surface of the water, said pull bar being where a tether is connected to the diver, wherein the diver is connected to said buoy;
a reconfigurable waterproof cable connecting said radio to the mobile device contained within a waterproof case, said waterproof cable comprising: a 6 pin cable connected to the mobile device; a micro universal serial bus converter, a plurality of splices connecting a plurality of additional waterproof cables to increase the length of said waterproof cable, said waterproof cable connected to a power converter, said power convertor connected to a further length of waterproof cable, said further length of waterproof cable connected to a 19 pin connector, and the 19 pin converter connected to the radio, and wherein the 19 pin connector enables ethernet connectivity, audio connectivity, and IGUS ethernet connectivity; said waterproof case sealing and protecting the mobile device and permitting native operation of the mobile device, comprising:
  an external connector wherein said external connector further comprises a water resistant in-line connector and a flange mounted connector,
  a water resistant, flexible bondable cable;
  a reconfigurable mobile device connector that is a micro universal series bus, wherein the reconfigurable mobile device connector provides adaptability to host different mobile devices;

a touchscreen extender interface screen that allows for magnetic interface with the mobile device and preserves capacitive touch capabilities of the screen and an external touch source;

a top plate cover comprising water seals and grooves capable of protective grip that holds, protects and secures said touchscreen extender interface screen and a top silicone gasket, said top silicone gasket creating a watertight seal and is capable of providing a baffle structure for said touchscreen extender interface screen, and is capable of positioning said top plate cover;

a top gasket that creates a watertight seal and is capable of preventing false button presses, holding said top plate cover, protecting said top plate cover, positioning said top plate cover, said water seals of said top plate cover, cushions said top plate cover, and electrically isolates said top plate cover, a midplate capable of housing electrical wire and electrical cable through a mechanical carbiner loop, further comprising a handle, said handle providing easy grip for said waterproof case, and an insert outlay;

a bottom gasket capable of creating a watertight seal for a bottom plate, said bottom plate covering the bottom of said waterproof case, said bottom plate capable of removal for removing the mobile device from said waterproof case; and a stylus case affixed to said waterproof case, said stylus case fitting around a stylus for enlarging the stylus, said watertight stylus case comprising: a cap, a top, a tube, an internal spring that pushes the stylus within said stylus case close enough to a foremost point of said stylus case to be capable of coming in close enough to the mobile device to allow mobile device touch screen functionality.

2. A system as in claim 1 wherein the mobile device comprises a cell phone.

3. A system as in claim 1 wherein the mobile device comprises a tablet.

4. A system as in claim 1 wherein said receiving device is a transceiver.

5. A system as in claim 1 wherein said waterproof case enables underwater control of the mobile device.

6. A system as in claim 1 wherein said waterproof case enables underwater communication with the mobile device.

7. A system as in claim 1 wherein said waterproof case enables underwater navigation with the mobile device.

8. A system as in claim 1 wherein said waterproof case enables full underwater capability of the mobile device.

9. A system as in claim 1 wherein said external touch source is a stylus pen.

10. A system as in claim 1 wherein said touchscreen extender interface screen is a fluid filled vessel.

11. A system as in claim 1 wherein said touchscreen extender interface screen is an air filled vessel.

12. A system as in claim 1 wherein said handle further comprises a one-way value capable of allowing air to be removed from said case.

13. A sub-surface mobile device system comprising:
a waterproof case comprising:
a top plate gasket forming a first central aperture and a first plurality of screw holes;
a sealing gasket forming a second central aperture and a second plurality of screw holes;
a middle plate forming an access aperture, a third central aperture, and a third plurality of screw holes;
a bottom plate forming a fourth plurality of screw holes;
a clear screen, wherein the clear screen is inserted between the front plate gasket and the sealing gasket such that the clear screen obstructs the first and second central apertures;
a plurality of screws,
wherein the first, second, third, and fourth pluralities of screw holes are aligned;
wherein inserting the plurality of screws through the first, second, third, and fourth pluralities of screw holes binds the top plate gasket, sealing gasket, middle plate, bottom plate, and clear screen together,
wherein the middle plate and bottom plate form a mobile device cavity;
a cable system with a first and a second end comprising:
a plurality of connecting cable segments; and
at least one splice connector electrically coupling the plurality of connecting cable segments with one of said at least one splice connector between each of connecting cable segment of the plurality of connecting cable segments such that the plurality of connecting cable segments are electrically coupled in series;
a buoy assembly comprising:
a buoy comprising a buoy body, a radio compartment, a wing, wherein the buoy body forms an interior aperture, wherein the wing adjusts the buoyancy of the buoy assembly;
a deck;
an upright mast, wherein a first end of the upright mast is coupled to the deck and a second end of the upright mast is coupled to the buoy;
at least one antenna coupled to the deck; and
a baffle coupled to the deck;
a communications cable with a first end coupled to the at least one antenna and a second end disposed within the radio compartment
wherein the first end of the cable system is disposed within the radio compartment and the second end of the cable system is disposed within the waterproof case, wherein the cable system is configured to transmit power and electronic signals between a radio and a mobile device.

14. A sub-surface mobile device system comprising:
a mobile device;
a waterproof case comprising:
a top plate gasket forming a first central aperture and a first plurality of screw holes;
a sealing gasket forming a second central aperture and a second plurality of screw holes;
a middle plate forming an access aperture, a third central aperture, and a third plurality of screw holes;
a bottom plate forming a fourth plurality of screw holes;
a clear screen, wherein the clear screen is inserted between the front plate gasket and the sealing gasket such that the clear screen obstructs the first and second central apertures;
a plurality of screws,
wherein the first, second, third, and fourth pluralities of screw holes are aligned;
wherein inserting the plurality of screws through the first, second, third, and fourth pluralities of screw holes binds the top plate gasket, sealing gasket, middle plate, bottom plate, and clear screen together, wherein the middle plate and bottom plate form a mobile device cavity;
a cable system with a first and a second end comprising:
a plurality of connecting cable segments; and
at least one splice connector electrically coupling the plurality of connecting cable segments with one of said at least one splice connector between each of connecting cable segment of the plurality of connecting cable segments such that the plurality of connecting cable segments are electrically coupled in series;
a power converter electrically coupled to a last connecting cable segment of the plurality of connecting cable segments;
a six-pin cable;
a USB converter,
a buoy assembly comprising:
a buoy comprising a buoy body, a radio compartment, a wing, and a pull bar, wherein the buoy body forms an interior aperture, wherein the wing adjusts the buoyancy of the buoy assembly;
a deck;
an upright mast, wherein a first end of the upright mast is coupled to the deck and a second end of the upright mast is coupled to the buoy;
at least one antenna coupled to the deck; and
a baffle coupled to the deck;
a communications cable with a first end coupled to the at least one antenna and a second end disposed within the radio compartment
a radio, wherein the radio is housed within the radio compartment, wherein the radio is coupled to the second end of the communications cable;
wherein the first end of the cable system is coupled to the radio and the second end of the cable system is coupled to the mobile device, wherein the cable system is configured to transmit power and electronic signals between the radio and the mobile device.

\* \* \* \* \*